US012674906B2

(12) United States Patent
Al-Dawood

(10) Patent No.: US 12,674,906 B2
(45) Date of Patent: Jul. 7, 2026

(54) SPATIAL VARIATIONS OF PORE PRESSURE

(71) Applicant: Saudi Arabian Oil Company, Dhahran (SA)

(72) Inventor: Ahmed Naseem Al-Dawood, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 677 days.

(21) Appl. No.: 18/189,026

(22) Filed: Mar. 23, 2023

(65) Prior Publication Data

US 2024/0319397 A1    Sep. 26, 2024

(51) Int. Cl.
*G01V 1/50* (2006.01)
*E21B 49/00* (2006.01)

(52) U.S. Cl.
CPC ............... *G01V 1/50* (2013.01); *E21B 49/00* (2013.01); *G01V 2210/1429* (2013.01); *G01V 2210/6226* (2013.01); *G01V 2210/6248* (2013.01)

(58) Field of Classification Search
CPC .. G01V 1/50; G01V 1/306; G01V 2210/1429; G01V 2210/6226; G01V 2210/6248; E21B 49/00
See application file for complete search history.

(56) References Cited

U.S. PATENT DOCUMENTS

| | | | | |
|---|---|---|---|---|
| 6,751,558 B2 * | 6/2004 | Huffman | .................. | G01V 1/32 |
| | | | | 702/14 |
| 6,977,866 B2 * | 12/2005 | Huffman | ................ | G01V 1/284 |
| | | | | 702/14 |
| 2003/0004648 A1 * | 1/2003 | Huffman | .................. | G01V 1/32 |
| | | | | 702/14 |

(Continued)

FOREIGN PATENT DOCUMENTS

| | | | | |
|---|---|---|---|---|
| CN | 104483703 A * | 4/2015 | | |
| WO | WO-2023078522 A2 * | 5/2023 | ............... | G01V 1/50 |

OTHER PUBLICATIONS

Elmahdy, Munir, and et al. "Pore pressure prediction in unconventional carbonate reservoir." In SPE Kingdom of Saudi Arabia annual technical symposium and exhibition, pp. SPE-194224. SPE, 2018 (Year: 2018).*

(Continued)

*Primary Examiner* — Douglas Kay
(74) *Attorney, Agent, or Firm* — Fish & Richardson P.C.

(57) ABSTRACT

Disclosed are methods, systems, and computer-readable medium to perform operations for calculating pore pressure in a reservoir, the operations including: receiving input data including: (i) a rock density in the reservoir, (ii) seismic data measured in the reservoir, and (iii) pore pressure measurement data from a Modular Formation Dynamic Tester (MDT); calculating, based on the rock density, an overburden pressure volume of the reservoir; generating, based on the overburden pressure volume, an overburden pressure (Continued)

volume of the reservoir; generating, based on the seismic data, an acoustic impedance volume of the reservoir; generating, based on the effective stress and overburden volumes, an estimated pore pressure volume of the reservoir; and calculating, based on the estimated pore pressure volume, a pore pressure gradient map indicative of the pore pressure in the reservoir.

20 Claims, 6 Drawing Sheets

(56)                References Cited

U.S. PATENT DOCUMENTS

| | | | |
|---|---|---|---|
| 2004/0141414 A1* | 7/2004 | Huffman | ................ G01V 1/306 |
| | | | 367/51 |
| 2022/0043176 A1 | 2/2022 | Sayers et al. | |
| 2024/0264332 A1* | 8/2024 | Hu | ........................ G01V 11/002 |

OTHER PUBLICATIONS

Kim, Mingi, Han-Saem Kim, and Choong-Ki Chung. "A three-dimensional geotechnical spatial modeling method for borehole dataset using optimization of geostatistical approaches." KSCE Journal of Civil Engineering 24, No. 3 (2020): 778-793 (Year: 2020).*

Dutta, N. C. "Geopressure prediction using seismic data: Current status and the road ahead." Geophysics 67, No. 6 (2002): 2012-2041 (Year: 2002).*

Kianoush, Pooria, and et al. "Application of pressure-volume (PV) fractal models in modeling formation pressure and drilling fluid determination in an oilfield of SW Iran." Journal of Petroleum Science and Technology 12, No. 1 (2022): 2-20 (Year: 2022).*

Biot, "General theory of three-dimensional consolidation," Journal of Applied Physics, 1941, 12:155-164, 12 pages.

Bowers, "Pore pressure estimation from velocity data: Accounting for overpressure mechanisms besides undercompaction," SPE Drilling & Completion, 10:89-95, 18 pages.

Eaton, "Fracture gradient prediction and its application in oilfield operations," Journal of Petroleum Technology, Oct. 1969, 21:1353-1360, 8 pages.

Hutomo et al., "Pore pressure prediction using eaton and neural network method in carbonate filed 'X' based on seismic data," IOP Conference Series: Materials Science and Engineering, 2019, 546:032017, 8 pages.

Sayers et al., "Predrill pore-pressure prediction using seismic data," Geophysics, Aug. 2002, 67:1286-1292, 7 pages.

Soleymani et al., "Velocity based pore pressure prediction—A case study at one of the Iranian southwest oil fields," Journal of Petroleum Science and Engineering, Jul. 2012, 7 pages.

Terzaghi, "Theoretical Soil Mechanics," John Wiley and Sons, Inc., 1943, 526 pages.

* cited by examiner

500

```
┌─────────────────────────────────────────────────────────────────────┐
│ RECEIVING INPUT DATA INCLUDING: (I) A ROCK DENSITY IN THE RESERVOIR, (II) │
│   SEISMIC DATA MEASURED IN THE RESERVOIR, AND (III) PORE PRESSURE       │
│  MEASUREMENTS FROM A MODULAR FORMATION DYNAMIC TESTER (MDT)             │
│                                                                502     │
└─────────────────────────────────────────────────────────────────────┘
                                 │
                                 ▼
┌─────────────────────────────────────────────────────────────────────┐
│ CALCULATING, BASED ON THE ROCK DENSITY, AN OVERBURDEN PRESSURE         │
│                    VOLUME OF THE RESERVOIR              504            │
└─────────────────────────────────────────────────────────────────────┘
                                 │
                                 ▼
┌─────────────────────────────────────────────────────────────────────┐
│ GENERATING, BASED ON THE OVERBURDEN PRESSURE VOLUME, AN                │
│   OVERBURDEN PRESSURE VOLUME OF THE RESERVOIR          506             │
└─────────────────────────────────────────────────────────────────────┘
                                 │
                                 ▼
┌─────────────────────────────────────────────────────────────────────┐
│ GENERATING, BASED ON THE SEISMIC DATA, AN ACOUSTIC IMPEDANCE VOLUME    │
│                    OF THE RESERVOIR                    508             │
└─────────────────────────────────────────────────────────────────────┘
                                 │
                                 ▼
┌─────────────────────────────────────────────────────────────────────┐
│ CALCULATING, BASED ON THE OVERBURDEN PRESSURE AND THE MDT PORE         │
│ PRESSURE MEASUREMENTS, AN EFFECTIVE STRESS VOLUME OF THE RESERVOIR     │
│                                                        510            │
└─────────────────────────────────────────────────────────────────────┘
                                 │
                                 ▼
┌─────────────────────────────────────────────────────────────────────┐
│ GENERATING, BASED ON THE EFFECTIVE STRESS VOLUME AND THE               │
│  OVERBURDEN VOLUME, AN ESTIMATED PORE PRESSURE VOLUME OF THE           │
│                    RESERVOIR                           512            │
└─────────────────────────────────────────────────────────────────────┘
                                 │
                                 ▼
┌─────────────────────────────────────────────────────────────────────┐
│ CALCULATING, BASED ON THE ESTIMATED PORE PRESSURE VOLUME OF THE        │
│  RESERVOIR, A PORE PRESSURE GRADIENT MAP INDICATIVE OF THE PORE        │
│                 PRESSURE IN THE RESERVOIR                              │
│                                                        514            │
└─────────────────────────────────────────────────────────────────────┘
```

FIG. 5

SPATIAL VARIATIONS OF PORE PRESSURE

TECHNICAL FIELD

This description relates to methods and systems for determining spatial variations of pore pressure in a reservoir.

BACKGROUND

Pore pressure may be estimated using data such as mud weights, repeat formation tests, extended leak-off tests, seismic velocities, and well log data. Estimating reservoir pore pressure operationally impacts drilling operations.

SUMMARY

A reservoir pore pressure allows drilling operators to analyze the risk for drilling exploration and developing wells in a reservoir. Additionally, the reservoir pore pressure allows drilling operators to accurately calculate the proper mud weight for the drilling operation. Doing so helps avoid formation collapse, well kicks, blowouts, or stuck pipe scenarios, among other problems. Further, the reservoir pore pressure enables operators to more accurately predict the productivity and success of drilling operations in the reservoir. For example, wells that fall within the high-pressure areas are likely to be more productive and more economical compared to counterpart wells in low pressure areas. However, existing techniques for calculating the reservoir pore pressure are inefficient, rely on inaccurate data, and/or are computationally expensive.

This disclosure describes methods and systems for determining pore pressure in a reservoir, and perhaps in glacial channels. In some embodiments, the methods and systems implement a workflow for determining an estimated spatial variation of pore pressure in a reservoir. The workflow also involves performing actions based on the estimated pore pressure. In one implementation, the workflow utilizes acoustic impedance inversion for populating an effective stress volume. A pore pressure volume is then generated from the difference between the effective stress volume and an overburden pressure volume.

One aspect of the subject matter described in this specification may be embodied in a method implemented using a system for managing operations involving a well in a subsurface region. The method involves receiving input data comprising: (i) a rock density in the reservoir, (ii) seismic data measured in the reservoir, and (iii) pore pressure measurements from a Modular Formation Dynamic Tester (MDT); calculating, based on the rock density, an overburden pressure volume of the reservoir; generating, based on the overburden pressure volume, an overburden pressure volume of the reservoir; generating, based on the seismic data, an acoustic impedance volume of the reservoir; calculating, based on the overburden pressure and the MDT pore pressure measurements, an effective stress volume of the reservoir; generating, based on the effective stress volume and the overburden volume, an estimated pore pressure volume of the reservoir; and calculating, based on the estimated pore pressure volume of the reservoir, a pore pressure gradient map indicative of the pore pressure in the reservoir.

The previously described implementation is implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, calculating, based on the rock density, the overburden pressure volume of the reservoir involves: calculating an overburden pressure dataset as $$P_{overburden} = \int_{surface}^{depth} p(z)g dz,$$

where p(z) is the is the density of the rock above a depth z, and g is a gravity acceleration in meter/second$^2$ (m/s$^2$); and generating the overburden pressure volume based on the overburden pressure dataset.

In some implementations, the overburden pressure dataset is calculated at one or more potential well locations.

In some implementations, the overburden pressure volume is generated based on the overburden pressure dataset using a Sequential Gaussian distribution method.

In some implementations, generating, based on the seismic data, the acoustic impedance volume of the reservoir involves using seismic inversion to transform the seismic data into the acoustic impedance volume.

In some implementations, calculating, based on the overburden pressure and the MDT pore pressure measurements, the effective stress volume of the reservoir involves subtracting the MDT pore pressure measurements from the overburden pressure volume.

In some implementations, generating, based on the effective stress volume and the overburden volume, the estimated pore pressure volume of the reservoir involves subtracting the effective stress volume from the overburden volume.

In some implementations, calculating, based on the estimated pore pressure volume of the reservoir, the pore pressure gradient map involves: picking a first top reservoir surface on a depth seismic volume; flattening the depth seismic volume and the estimated pore pressure volume based on the top reservoir surface; picking a second top reservoir surface on the flattened depth seismic to extract the pore pressure values from the flattened estimated pore pressure volume; and generating the pore pressure gradient map by dividing the extracted pore pressure values on the flattened reservoir surface by an average reservoir depth.

Advantages of the disclosed methods and systems include lowering the risk analysis in predicting pore pressure for future planned wells to avoid formation collapse, well kicks, blowouts, or stuck pipe scenarios. Additionally, the disclosed methods and systems provide a more accurate prediction for pore pressure gradient compared to existing techniques. Further, the disclosed methods and systems are more efficient, faster, and consume less processing power than existing techniques, which use computing intensive techniques that rely on large datasets (e.g., P-wave velocity, which have high uncertainties).

The details of one or more embodiments of these systems and methods are set forth in the accompanying drawings and description below. Other features, objects, and advantages of these systems and methods will be apparent from the description, drawings, and claims.

BRIEF DESCRIPTION OF THE DRAWINGS

FIG. 5 illustrates a flowchart of an example method, according to some implementations.

Like reference numbers and designations in the various drawings indicate like elements.

DETAILED DESCRIPTION

Reservoir pore pressure prediction is vital for mitigation of risks associated with drilling hazards and targeting economic prospects. Pore pressure prediction from seismic data is challenging as there is no direct relationship between pore pressure and elastic properties. This disclosure describes methods and systems for determining the spatial variation of pore pressure in a reservoir (e.g., glacial sandstone channels) by using acoustic impedance methods. The disclosed methods and systems enable the utilization of acoustic impedance inversion for populating an effective stress volume. A pore pressure volume is later generated from the difference between the effective stress and the overburden pressure volumes.

For the purposes of this disclosure, glacial channels are channel/valleys formed by the erosive actions of glaciers. As a glacier moves downhill, it carries rocks, sediments, and debris along with it, which then erode the underlying rock, leaving a deep channel/valley. A glacial channel reservoir is a geological formation where hydrocarbon is stored in porous rocks. These reservoirs are deposited as a result of the glaciers that deposited large amounts of sediments in the deep channel/valley.

Figure 1:
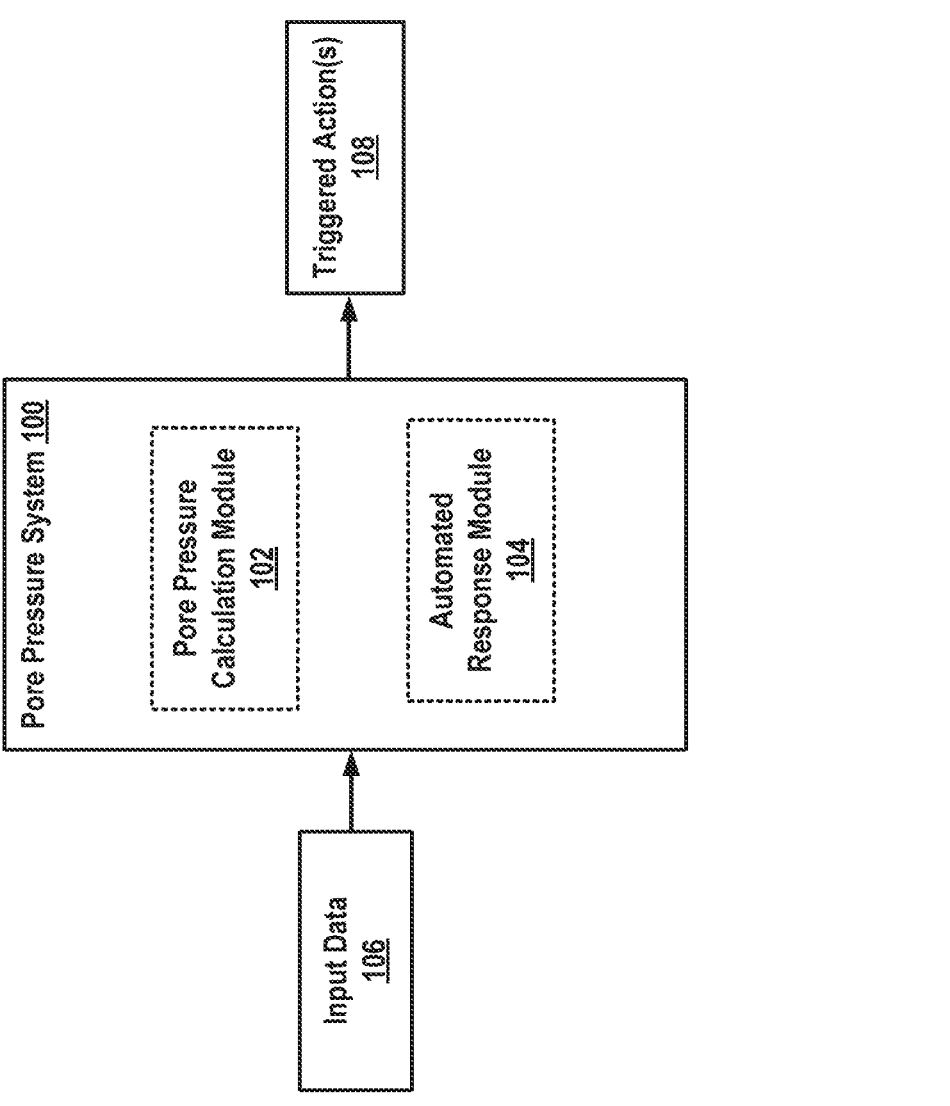
FIG. 1 illustrates a pore pressure system, according to some implementations.

FIG. 1 illustrates a pore pressure system 100, according to some implementations. As shown in FIG. 1, the pore pressure system 100 includes a pore pressure calculation module 102 and an automated response module 104. The pressure calculation module 102 is configured to receive input data 106 and use the input data 106 in a pore pressure calculation workflow (e.g., workflow 200 of FIG. 2). The pressure calculation module 102 provides the calculated pore pressure to automated response module 104, which determines one or more actions 108 to perform based on the calculated pore pressure. The automated response module 104 then triggers the one or more actions 108 to be performed, e.g., by generating instructions to one or more components of a drilling system to perform the action(s). In some examples, the one or more actions 108 include calculating a mud weight that is used in drilling, calculating an original gas in place, and anticipating drilling hazards. Furthermore, drilling operation actions can be determined based on the one or more actions 108. For example, a determination whether or where to drill can be performed based on the calculated gas in place and/or the anticipated drilling hazards.

Figure 2:
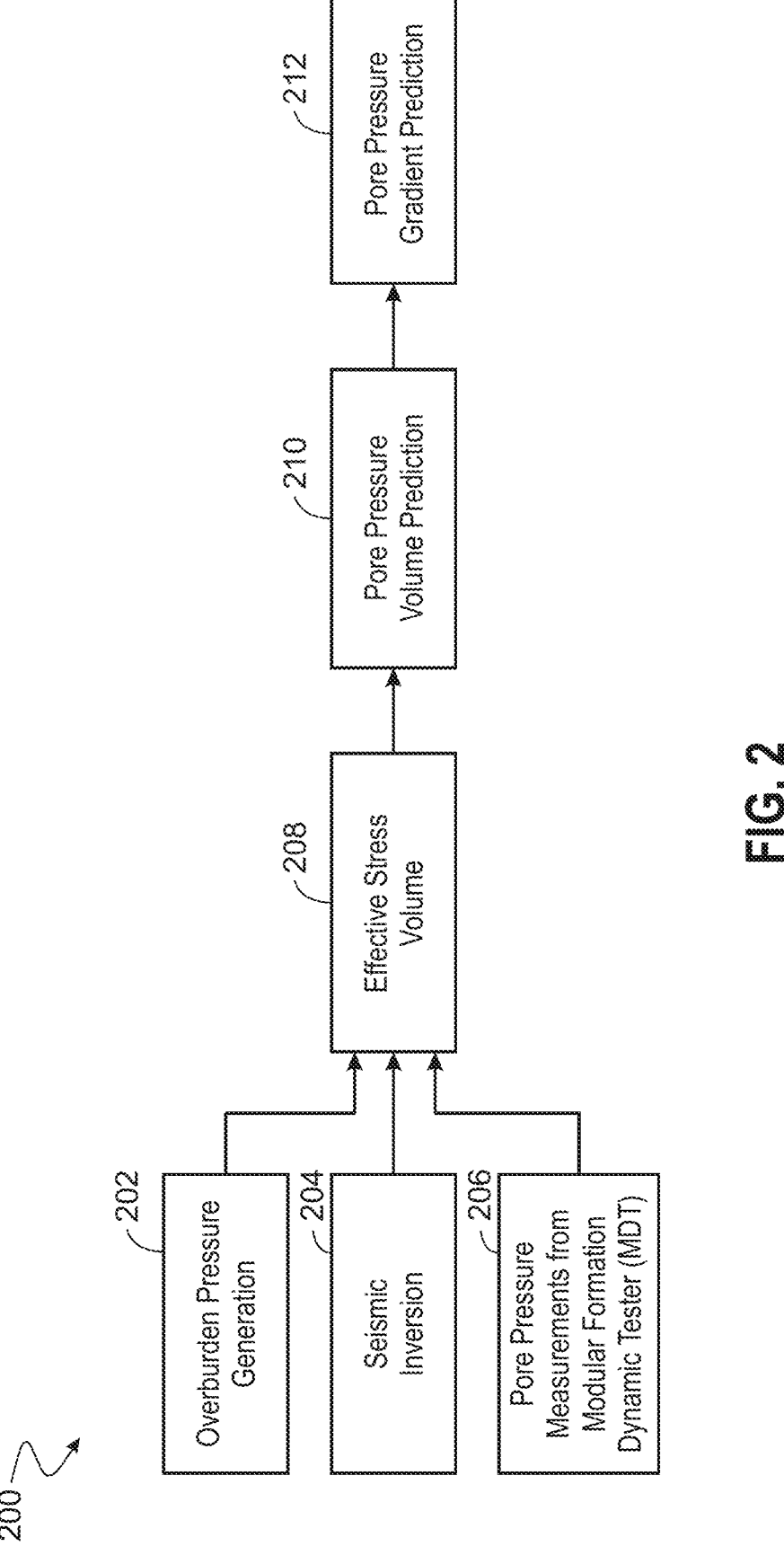
FIG. 2 illustrates a workflow for calculating pore pressure in a reservoir, according to some implementations.

FIG. 2 illustrates a workflow 200 for calculating pore pressure in a reservoir, according to some implementations. As described in more detail below, the workflow 200 calculates the pore pressure in the reservoir by calculating the pore pressure in one or more potential well locations.

At step 202, the workflow 200 involves calculating an overburden pressure in the reservoir. The pore pressure calculation module 102 can calculate the overburden pressure by integrating rock density over a specific depth. In one example, the pore pressure calculation module 102 calculates the overburden pressure using Equation [1]:

$$P_{overburden} = \int_{surface}^{depth} p(z)gdz. \qquad [1]$$

In Equation [1], p(z) is the density of the rock above the depth z, and g is the gravity acceleration in meter/second$^2$ (m/s$^2$). The rock density is measured at each well location using a density well log that is measured by emitting gamma ray into the formation, which collides with the formation's electrons. The number of collisions is related to the number of electrons in the formation. Gamma rays reach the detectors more in a low-density than in a high-density formation. As shown by Equation [1], the pore pressure calculation module 102 calculates the overburden pressure at the potential well locations. More specifically, the overburden pressure is calculated using the integral summation of density log multiplied by gravity. The depth is the coverage of the log calculations from shallow/surface to the reservoir depth. Then, the pore pressure calculation module 102 populates the overburden pressure into an overburden pressure volume using a Sequential Gaussian distribution method. Other techniques for spatial interpolation include inverse distance weighting, kriging, co-kriging, spline interpolation, and trend surface analysis.

At step 204, the workflow 200 involves using seismic inversion to generate an acoustic impedance volume of the reservoir. In this step, the pore pressure calculation module 102 obtains seismic data measured in the reservoir (e.g., at or near the potential wells). Then, the pore pressure calculation module 102 uses seismic inversion to transform the seismic data into the acoustic impedance volume. At step 206, the workflow involves obtaining pore pressure measurements from a Modular Formation Dynamic Tester (MDT tool) at or near the potential wells.

At step 208, the workflow 200 involves calculating an effective stress volume of the reservoir. To do so, the pore pressure calculation module 102 calculates an effective stress at the potential wells by subtracting the MDT measured pore pressure from the overburden pressure calculated in step 202. Then, the pore pressure calculation module 102 generates the effective stress volume by cross plotting an acoustic impedance log against the effective stress at one or more of the potential wells. The pore pressure calculation module 102 uses the cross-plot to derive a relationship (e.g., a linear relationship) that can be used to guide the prediction of effective stress from the acoustic impedance volume. The effective stress volume is then generated by using the derived relationship to transform the time-based effective stress data into a depth-based effective stress volume.

Figure 3:
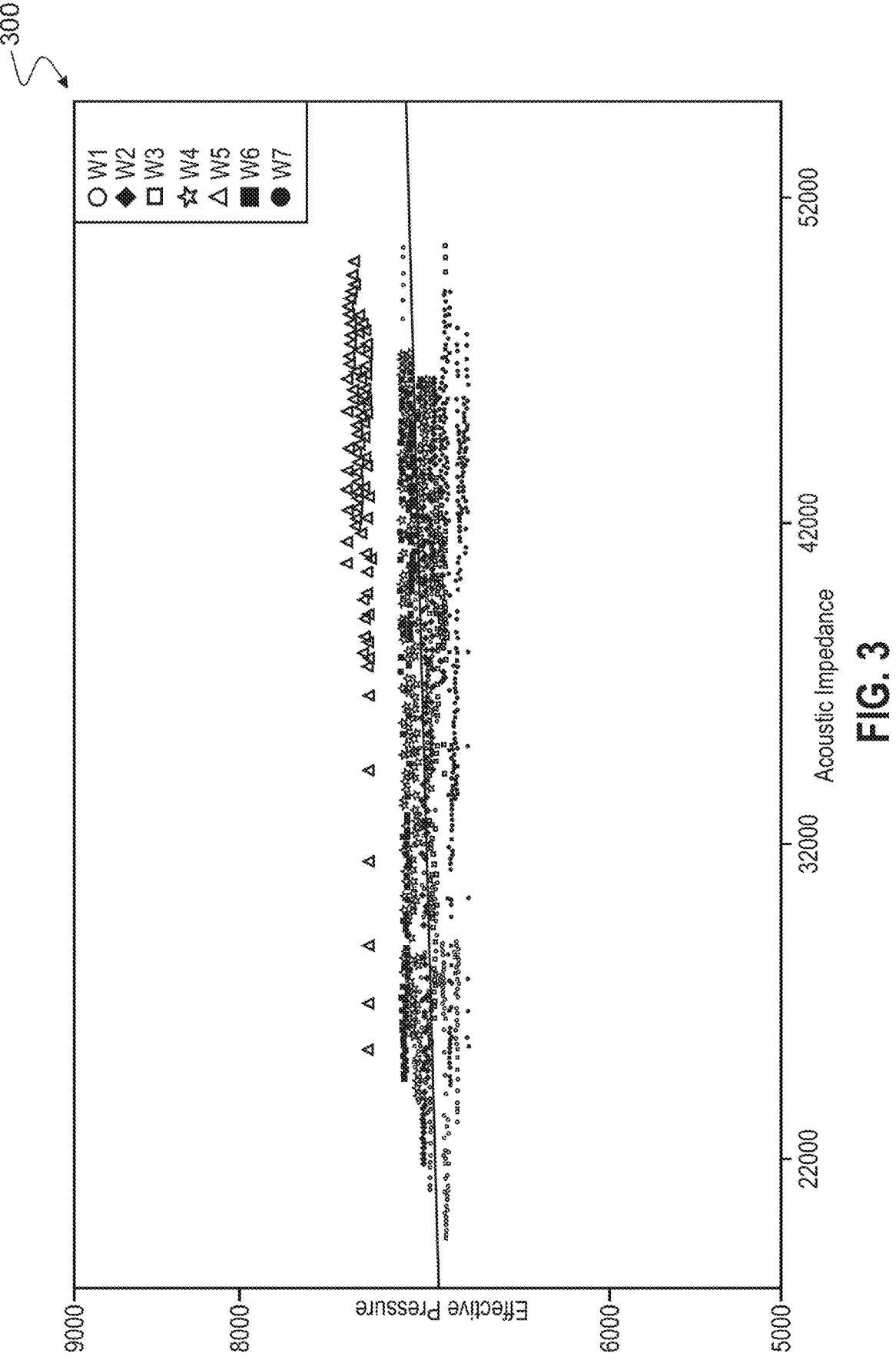
FIG. 3 illustrates a cross-plot of an acoustic impedance log against effective stress data at one or more of the wells, according to some implementations.

FIG. 3 illustrates a cross-plot 300 of an acoustic impedance log against effective stress data at one or more of the wells, according to some implementations. The cross-plot 300 can be used to derive a relationship between the acoustic impedance log and the effective stress data. In this example, a best-fit linear line through the plotted points is used to derive a linear relationship between the acoustic impedance log and the effective stress data. Note that in this example, the data points of well 5 slightly deviate from the other data points due to well 5 having a higher overburden pressure.

Returning to FIG. 2, at step 210, the workflow 200 involves generating an estimated pore pressure volume. In this step, the pore pressure calculation module 102 generates an estimated pore pressure volume by subtracting the effective stress volume from the overburden volume generated in step 202.

At step 212, the workflow 200 involves calculating a pore pressure gradient. In this step, the pore pressure calculation module 102 generates a pore pressure gradient map. In some examples, generating the pore pressure gradient map involves several sub-steps. In a first sub-step, the pore pressure calculation module 102 picks a top reservoir surface on a depth seismic volume. More specifically, on a cross section of the seismic volume that is in depth. To pick the top reservoir, the top reservoir seismic reflector is traced along the entire seismic volume to create a 2D depth surface map of the top reservoir. In a second sub-step, the pore pressure calculation module 102 flattens the seismic and the predicted pore pressure volumes based on the top reservoir surface. Flattening means flattening the top reservoir surface in the seismic and the pore pressure volumes to unify the top reservoir depth in all the drilled wells. In general, flattened seismic data means correction for the effects of structural variation in the subsurface beneath the flattened surface which in this case the top reservoir surface. The pore pressure calculation module 102 performs this sub-step to unify the top reservoir depth on all of the wells.

In a third sub-step, the pore pressure calculation module 102 picks a top reservoir on the flattened depth seismic to extract the pore pressure values from the flattened pore pressure volumes on the top reservoir surface. In a fourth sub-step, the pore pressure calculation module 102 calculates the pore pressure gradient by dividing the extracted pore pressure values on the flattened reservoir surface by the average reservoir depth.

Figures 4A, 4B:
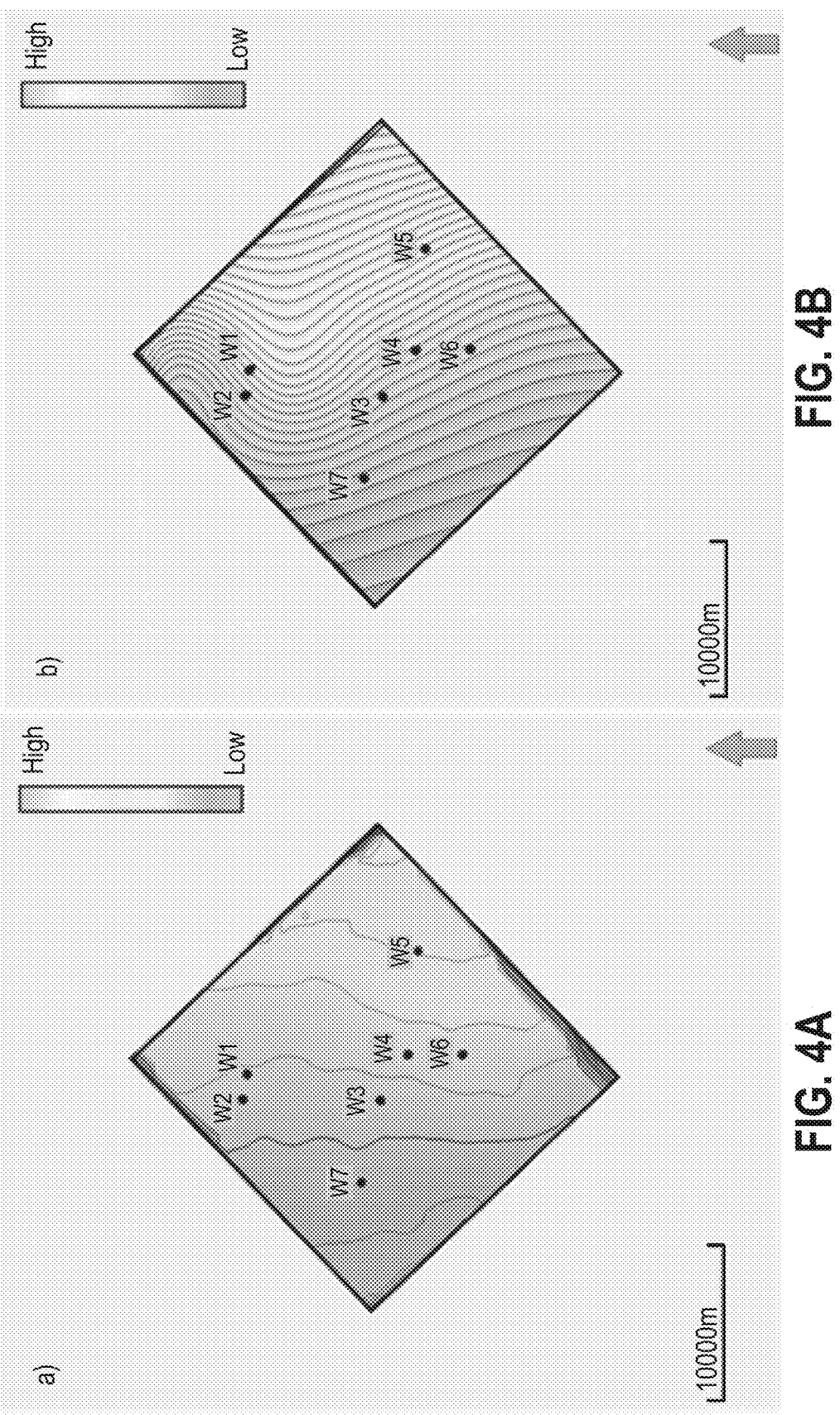
FIG. 4A illustrates predicted pore pressure gradient map, according to some implementations.
FIG. 4B illustrates an actual pore pressure gradient map from wells, according to some implementations.

FIG. 4A illustrates predicted pore pressure gradient map and FIG. 4B illustrates an actual pore pressure gradient map from wells, according to some implementations. As shown in these figures, the estimated pore pressure gradient map displays a good match with the pore pressure gradient map that is derived from wells MDT data.

FIG. 5 illustrates a flowchart of an example method 500, according to some implementations. For clarity of presentation, the description that follows generally describes method 500 in the context of the other figures in this description. For example, method 500 can be performed by the pore pressure system of FIG. 1. It will be understood that method 500 can be performed, for example, by any suitable system, environment, software, hardware, or a combination of systems, environments, software, and hardware, as appropriate. In some implementations, various steps of method 500 can be run in parallel, in combination, in loops, or in any order.

At step 502, the method 500 involves receiving input data including: (i) a rock density in the reservoir, (ii) seismic data measured in the reservoir, and (iii) pore pressure measurements from a Modular Formation Dynamic Tester (MDT).

At step 504, the method 500 involves calculating, based on the rock density, an overburden pressure volume of the reservoir.

At step 506, the method 500 involves generating, based on the overburden pressure volume, an overburden pressure volume of the reservoir.

At step 508, the method 500 involves generating, based on the seismic data, an acoustic impedance volume of the reservoir.

At step 510, the method 500 involves calculating, based on the overburden pressure and the MDT pore pressure measurements, an effective stress volume of the reservoir.

At step 512, the method 500 involves generating, based on the effective stress volume and the overburden volume, an estimated pore pressure volume of the reservoir.

At step 514, the method 500 involves calculating, based on the estimated pore pressure volume of the reservoir, a pore pressure gradient map indicative of the pore pressure in the reservoir.

In some implementations, calculating, based on the rock density, the overburden pressure volume of the reservoir involves: calculating an overburden pressure dataset as $$P_{overburden} = \int_{surface}^{depth} p(z)gdz,$$

where p(z) is the is the density of the rock above a depth z, and g is a gravity acceleration in meter/second$^2$ (m/s$^2$); and generating the overburden pressure volume based on the overburden pressure dataset.

In some implementations, the overburden pressure dataset is calculated at one or more potential well locations.

In some implementations, the overburden pressure volume is generated based on the overburden pressure dataset using a Sequential Gaussian distribution method.

In some implementations, generating, based on the seismic data, the acoustic impedance volume of the reservoir involves using seismic inversion to transform the seismic data into the acoustic impedance volume.

In some implementations, calculating, based on the overburden pressure and the MDT pore pressure measurements, the effective stress volume of the reservoir involves subtracting the MDT pore pressure measurements from the overburden pressure volume.

In some implementations, generating, based on the effective stress volume and the overburden volume, the estimated pore pressure volume of the reservoir involves subtracting the effective stress volume from the overburden volume.

In some implementations, calculating, based on the estimated pore pressure volume of the reservoir, the pore pressure gradient map involves: picking a first top reservoir surface on a depth seismic volume; flattening the depth seismic volume and the estimated pore pressure volume based on the top reservoir surface; picking a second top reservoir surface on the flattened depth seismic to extract the pore pressure values from the flattened estimated pore pressure volume; and generating the pore pressure gradient map by dividing the extracted pore pressure values on the flattened reservoir surface by an average reservoir depth.

Figure 6:
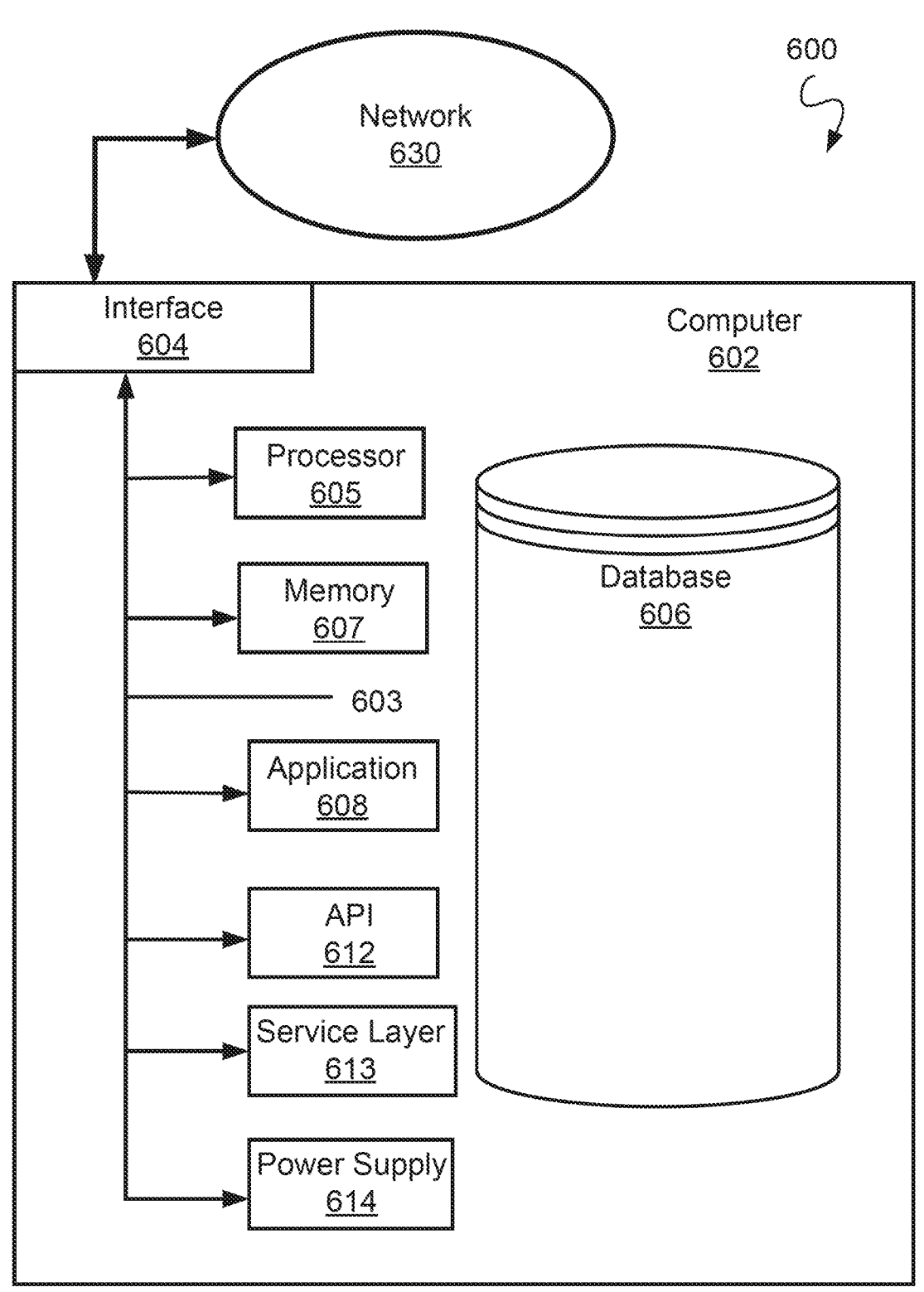
FIG. 6 is a block diagram of an example computer system, according to some implementations.

FIG. 6 is a block diagram of an example computer system 600 that can be used to provide computational functionalities associated with described algorithms, methods, functions, processes, flows, and procedures, according to some implementations of the present disclosure. In some implementations, the pore pressure system 100 can be the computer system 600, include the computer system 600, or the pore pressure system 100 can communicate with the computer system 600.

The illustrated computer 602 is intended to encompass any computing device such as a server, a desktop computer, an embedded computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI). In some implementations, the inputs and outputs include display ports (such as DVI-I+2× display ports), USB 3.0, GbE ports, isolated DI/O, SATA-III (6.0 Gb/s) ports, mPCIe slots, a combination of these, or other ports. In instances of an edge gateway, the computer 602 can include a Smart Embedded Management Agent (SEMA), such as a built-in ADLINK SEMA 2.2, and a video sync technology, such as Quick Sync Video technology supported by ADLINK MSDK+. In some examples, the computer 602 can include the MXE-5400 Series processor-based fanless embedded computer by ADLINK, though the computer 602 can take other forms or include other components.

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a high level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both), over the system bus. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs 612.

The service layer 613 can provide software services to the computer 602 and other components (whether illustrated or not) that are communicably coupled to the computer 602. The functionality of the computer 602 can be accessible for all service consumers using this service layer 613. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 can include an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and manipulate data to perform the operations of the computer 602, including operations using algorithms, methods, functions, processes, flows, and procedures as described in the present disclosure.

The computer 602 can also include a database 606 that can hold data for the computer 602 and other components connected to the network 630 (whether illustrated or not). For example, database 606 can be an in-memory, conventional, or a database storing data consistent with the present disclosure. In some implementations, the database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

An application 608 can be an algorithmic software engine providing functionality according to particular needs, desires, or particular implementations of the computer 602 and the described functionality. For example, an application 608 can serve as one or more components, modules, or applications 608. Multiple applications 608 can be implemented on the computer 602. Each application 608 can be internal or external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system including computer 602, with each computer 602 communicating over network 630. Further, the terms "client," "user," and other appropriate terminology can be used interchangeably without departing from the scope of the present disclosure. Moreover, the present disclosure contemplates that many users can use one computer 602 and one user can use multiple computers 602.

Implementations of the subject matter and the functional operations described in this specification can be implemented in digital electronic circuitry, in tangibly embodied computer software or firmware; in computer hardware, including the structures disclosed in this specification and their structural equivalents; or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus and special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, Linux, Unix, Windows, Mac OS, Android, or iOS.

A computer program, which can also be referred to or described as a program, software, a software application, a module, a software module, a script, or code can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document; in a single file dedicated to the program in question; or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes; the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random-access memory (RAM), read only memory (ROM), phase change memory (PRAM), static random-access memory (SRAM), dynamic random-access memory (DRAM), erasable programmable read-only memory (EPROM), electrically erasable programmable read-only memory (EE-PROM), and flash memory devices. Computer readable media can also include, for example, magnetic devices such as tape, cartridges, cassettes, and internal/removable disks. Computer readable media can also include magneto optical disks, optical memory devices, and technologies including, for example, digital video disc (DVD), CD ROM, DVD+/− R, DVD-RAM, DVD-ROM, HD-DVD, and BLURAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), or a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, or in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations; and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A method for calculating pore pressure in a reservoir, the method comprising:

receiving input data comprising: (i) a rock density in the reservoir, (ii) seismic data measured in the reservoir, and (iii) pore pressure measurement data from a Modular Formation Dynamic Tester (MDT);

calculating, based on the rock density, an overburden pressure volume of the reservoir;

generating, based on the seismic data, an acoustic impedance volume of the reservoir;

calculating, based on the overburden pressure volume and the pore pressure measurement data, an effective stress volume of the reservoir;

generating, based on the effective stress volume and the overburden pressure volume, an estimated pore pressure volume of the reservoir;

selecting a first top reservoir surface on a first depth seismic volume;

flattening the first depth seismic volume based on a reference top reservoir surface by correcting effects of structural variation in the subsurface beneath the first top reservoir surface aligning with the reference top reservoir surface for unifying top reservoir surfaces into the reference top reservoir surface;

calculating a first estimated pore pressure volume based on the reference top reservoir surface;

selecting a second top reservoir surface on a second depth seismic volume;

flattening the second depth seismic volume and obtain a second estimated pore pressure volume based on the reference top reservoir surface;

calculating a pore pressure gradient map, by dividing the pore pressure values on the flattened reservoir surface by an average reservoir depth; and generating instructions for a drilling system to perform a drilling operation determined by one or more actions comprising a determination of a drill location based on the pore pressure gradient map and anticipated drilling hazards.

2. The method of claim 1, wherein calculating, based on the rock density, the overburden pressure volume of the reservoir comprises:

calculating an overburden pressure dataset as $$P_{overburden} = \int_{surface}^{depth} p(z)g \ dz,$$

where p(z) is the rock density of the rock above a depth z, and g is a gravity acceleration in meter/second$^2$ (m/s$^2$); and generating the overburden pressure volume based on the overburden pressure dataset.

3. The method of claim 2, wherein the overburden pressure dataset is calculated at one or more potential well locations.

4. The method of claim 2, wherein the overburden pressure volume is generated based on the overburden pressure dataset using a Sequential Gaussian distribution method.

5. The method of claim 1, wherein generating, based on the seismic data, the acoustic impedance volume of the reservoir comprises using seismic inversion to transform the seismic data into the acoustic impedance volume.

6. The method of claim 1, wherein calculating, based on the overburden pressure volume and the pore pressure measurements, the effective stress volume of the reservoir comprises subtracting the pore pressure measurements from the overburden pressure volume.

7. The method of claim 1, wherein generating, based on the effective stress volume and the overburden volume, the estimated pore pressure volume of the reservoir comprises subtracting the effective stress volume from the overburden volume.

8. The method of claim 1, wherein the drilling operation comprises: delivering a proper mud weight for the drilling operation to avoid formation collapse, well kicks, blowouts, or stuck pipe scenarios.

9. A system for calculating pore pressure in a reservoir, the system comprising:

one or more processors configured to perform operations comprising:

receiving input data comprising: (i) a rock density in the reservoir, (ii) seismic data measured in the reservoir, and (iii) pore pressure measurement data from a Modular Formation Dynamic Tester (MDT);

calculating, based on the rock density, an overburden pressure volume of the reservoir;

generating, based on the seismic data, an acoustic impedance volume of the reservoir;

calculating, based on the overburden pressure volume and the pore pressure measurement data, an effective stress volume of the reservoir;

generating, based on the effective stress volume and the overburden pressure volume, an estimated pore pressure volume of the reservoir;

selecting a first top reservoir surface on a first depth seismic volume;

flattening the first depth seismic volume based on a reference top reservoir surface by correcting effects of structural variation in the subsurface beneath the first top reservoir surface aligning with the reference top reservoir surface for unifying top reservoir surfaces into the reference top reservoir surface;

calculating a first estimated pore pressure volume based on the reference top reservoir surface;

selecting a second top reservoir surface on a second depth seismic volume;

flattening the second depth seismic volume and obtain a second estimated pore pressure volume based on the reference top reservoir surface;

calculating a pore pressure gradient map, by dividing the pore pressure values on the flattened reservoir surface by an average reservoir depth; and generating instructions for a drilling system to perform a drilling operation determined by one or more actions comprising a determination of a drill location based on the pore pressure gradient map and anticipated drilling hazards.

10. The system of claim 9, wherein calculating, based on the rock density, the overburden pressure volume of the reservoir comprises:

calculating an overburden pressure dataset as $$P_{overburden} = \int_{surface}^{depth} p(z)g \ dz,$$

where p(z) is the rock density of the rock above a depth z, and g is a gravity acceleration in meter/second$^2$ (m/s$^2$); and generating the overburden pressure volume based on the overburden pressure dataset.

11. The system of claim 10, wherein the overburden pressure dataset is calculated at one or more potential well locations.

12. The system of claim 10, wherein the overburden pressure volume is generated based on the overburden pressure dataset using a Sequential Gaussian distribution method.

13. The system of claim 9, wherein generating, based on the seismic data, the acoustic impedance volume of the reservoir comprises using seismic inversion to transform the seismic data into the acoustic impedance volume.

14. The system of claim 9, wherein calculating, based on the overburden pressure volume and the pore pressure measurements, the effective stress volume of the reservoir comprises subtracting the pore pressure measurements from the overburden pressure volume.

15. The system of claim 9, wherein generating, based on the effective stress volume and the overburden volume, the estimated pore pressure volume of the reservoir comprises subtracting the effective stress volume from the overburden volume.

16. The system of claim 9, wherein the drilling operation comprises: delivering a proper mud weight for the drilling operation to avoid formation collapse, well kicks, blowouts, or stuck pipe scenarios.

17. A non-transitory computer storage medium encoded with instructions that, when executed by one or more computers, cause the one or more computers to perform operations for calculating pore pressure in a reservoir, the operations comprising:

receiving input data comprising: (i) a rock density in the reservoir, (ii) seismic data measured in the reservoir, and (iii) pore pressure measurement data from a Modular Formation Dynamic Tester (MDT);

calculating, based on the rock density, an overburden pressure volume of the reservoir;

generating, based on the seismic data, an acoustic impedance volume of the reservoir;

calculating, based on the overburden pressure volume and the pore pressure measurement data, an effective stress volume of the reservoir;

generating, based on the effective stress volume and the overburden pressure volume, an estimated pore pressure volume of the reservoir;

selecting a first top reservoir surface on a first depth seismic volume;

flattening the first depth seismic volume based on a reference top reservoir surface by correcting effects of structural variation in the subsurface beneath the first top reservoir surface aligning with the reference top reservoir surface for unifying top reservoir surfaces into the reference top reservoir surface;

calculating a first estimated pore pressure volume based on the reference top reservoir surface;

selecting a second top reservoir surface on a second depth seismic volume;

flattening the second depth seismic volume and obtain a second estimated pore pressure volume based on the reference top reservoir surface;

calculating a pore pressure gradient map, by dividing the pore pressure values on the flattened reservoir surface by an average reservoir depth; and generating instructions for a drilling system to perform a drilling operation determined by one or more actions comprising a determination of a drill location based on the pore pressure gradient map and anticipated drilling hazards.

18. The non-transitory computer storage medium of claim 17, wherein calculating, based on the rock density, the overburden pressure volume of the reservoir comprises:

calculating an overburden pressure dataset as $$P_{overburden} = \int_{surface}^{depth} p(z)g \ dz,$$

where p(z) is the rock density of the rock above a depth z, and g is a gravity acceleration in meter/second$^2$ (m/s$^2$); and generating the overburden pressure volume based on the overburden pressure dataset.

19. The non-transitory computer storage medium of claim 18, wherein the overburden pressure dataset is calculated at one or more potential well locations.

20. The non-transitory computer storage medium of claim 18, wherein the overburden pressure volume is generated based on the overburden pressure dataset using a Sequential Gaussian distribution method.

\* \* \* \* \*